United States Patent
Bill et al.

(10) Patent No.: US 8,662,109 B2
(45) Date of Patent: Mar. 4, 2014

(54) PROPORTIONAL PRESSURE CONTROL VALVE

(75) Inventors: Markus Bill, Heusweiler (DE); Peter Bruck, Althombach (DE); Gerd Schneider, Dillingen (DE)

(73) Assignee: Hydac Fluidtechnik GmbH, Sulzback/Saar (DE)

( * ) Notice: Subject to any disclaimer, the term of this patent is extended or adjusted under 35 U.S.C. 154(b) by 41 days.

(21) Appl. No.: 13/138,281

(22) PCT Filed: Nov. 4, 2009

(86) PCT No.: PCT/EP2009/007882
§ 371 (c)(1),
(2), (4) Date: Aug. 22, 2011

(87) PCT Pub. No.: WO2010/085991
PCT Pub. Date: Aug. 5, 2010

(65) Prior Publication Data
US 2011/0297856 A1 Dec. 8, 2011

(30) Foreign Application Priority Data
Jan. 28, 2009 (DE) .......................... 10 2009 006 445

(51) Int. Cl.
*F15B 13/043* (2006.01)
(52) U.S. Cl.
USPC .................................. 137/625.64; 137/625.68
(58) Field of Classification Search
USPC ........................................ 137/625.64, 625.68
See application file for complete search history.

(56) References Cited

U.S. PATENT DOCUMENTS

| | | | | |
|---|---|---|---|---|
| 4,432,391 A * | 2/1984 | Ott ............................ | 137/625.64 |
| 4,510,973 A * | 4/1985 | Balaskas ................... | 137/625.64 |
| 4,561,344 A * | 12/1985 | Klocke et al. ............... | 91/358 A |
| 4,576,200 A * | 3/1986 | Janecke et al. ........... | 137/624.13 |
| 5,042,832 A * | 8/1991 | Takahashi et al. ........ | 137/625.64 |
| 5,236,015 A * | 8/1993 | Schwelm .................. | 137/625.18 |
| 6,286,535 B1 | 9/2001 | Harms et al. | |
| 6,408,883 B2 * | 6/2002 | Motoki et al. ............ | 137/625.64 |
| 6,598,622 B1 * | 7/2003 | Reith et al. ................ | 137/625.66 |
| 7,380,571 B2 * | 6/2008 | Okamoto .................. | 137/625.69 |

FOREIGN PATENT DOCUMENTS

| | | |
|---|---|---|
| DE | 100 25 772 | 11/2001 |
| DE | 103 25 178 | 1/2005 |
| DE | 10 2005 058 846 | 6/2007 |
| WO | WO 2007/065566 | 6/2007 |

* cited by examiner

*Primary Examiner* — John Rivell
*Assistant Examiner* — R. K. Arundale
(74) *Attorney, Agent, or Firm* — Roylance, Abrams, Berdo & Goodman LLP

(57) ABSTRACT

A proportional pressure control valve includes a valve box (10) having a pump (P), user (A) and reservoir (T) connections. Control piston (18) is guided in a longitudinally displaceably inside the valve box (10) for optionally connecting the pump connection (P) to the user connection (A) and the user connection (A) to the reservoir connection (T). A fluid-carrying connection is established between the pump connection (P) and a pilot chamber (20) of a pilot valve (22). The pilot valve (22) is controlled by a magnet system, especially a proportional magnet system (28). The proportional pressure control valve, for the fluid-carrying connection to the pilot chamber (20), has a bore (27) extending axially inside the wall of the valve box (10) and from a radial bore (9) of the housing (10) forming the pump connection (P).

18 Claims, 6 Drawing Sheets

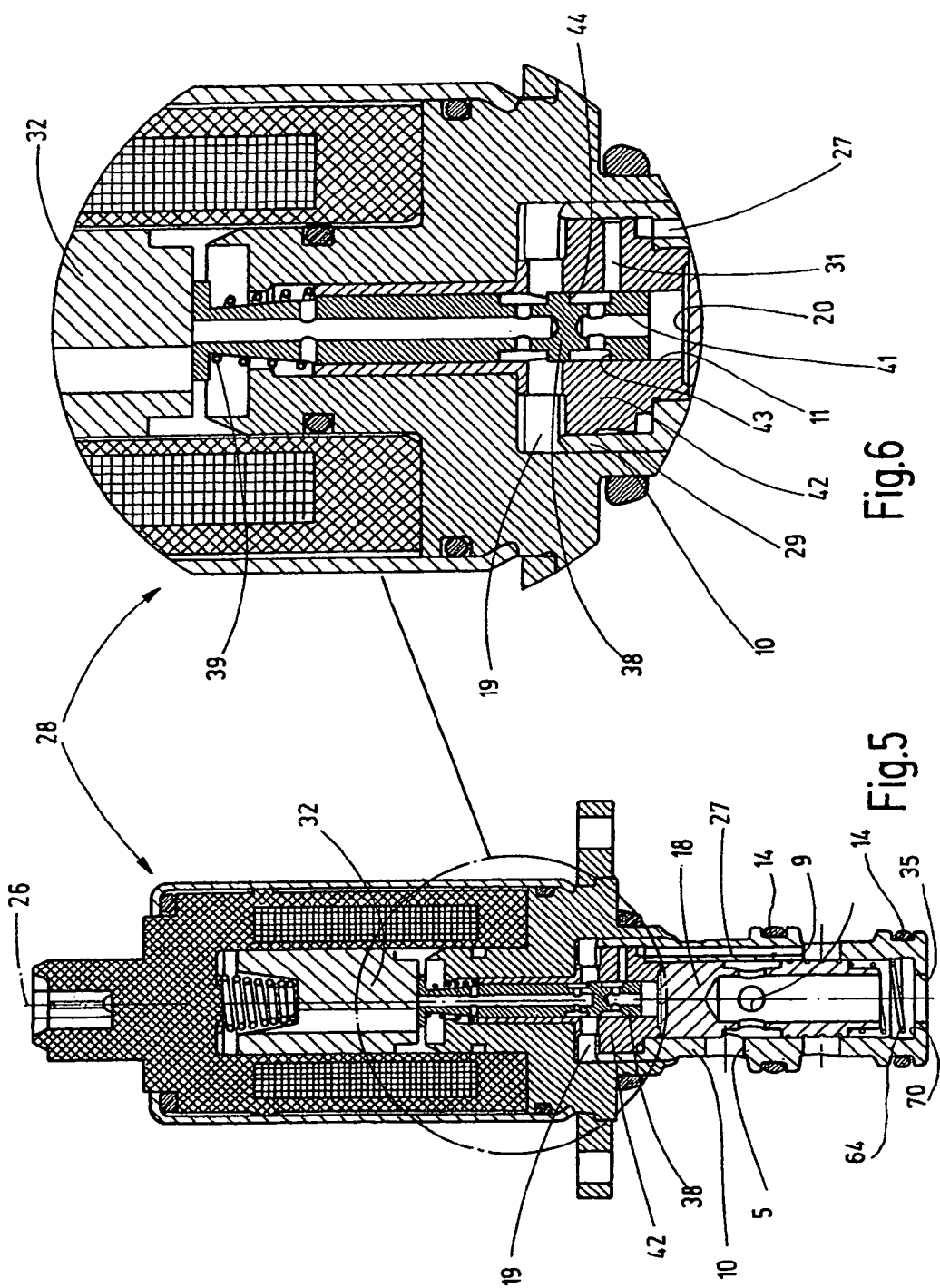

PROPORTIONAL PRESSURE CONTROL VALVE

FIELD OF THE INVENTION

The invention relates to a proportional pressure control valve comprising a valve housing having at least three fluid-conducting connections, particularly in the form of a pump connection, a user connection, and a tank connection. A control piston is guided to be able to move lengthwise within the valve housing for selective connection of the pump connection to the user connection and of the user connection to the tank connection. A fluid-conducting connection is provided between the pump connection and a pilot chamber of a pilot valve. The pilot valve is controllable by a magnet system, in particular a proportional magnet system.

BACKGROUND OF THE INVENTION

For applications in which large volumetric flows are controlled, pilot-controlled pressure control valves are preferably used instead of directly controlled valves. A high volumetric flow means both large opening cross sections of the valves for large strokes and large flow forces which counteract the magnetic force of the magnet system to be actuated as a disturbance variable. To resolve these problems, the magnet system would have to be dimensioned to be correspondingly large for directly controlled valves.

For applications of this type, valves are known in the prior art which have hydraulic piloting, see DE 103 25 178 A1. This known solution is characterized, compared to other proposed solutions which are prior art and which are disclosed by U.S. Pat. No. 6,286,535 B1, in that the valve is able to set a pressure value of 0 bar on the user connection when the magnet system is not actuated. For the valves disclosed in that U.S. patent, this ability is not possible because, according to its construction, the control piston is returned to its end position by a clamped compression spring when the magnet system has not been actuated. Due to this mechanical configuration, these valves still have a pressure level which corresponds to the force of the clamped spring when there is no electrical control signal of the magnet system present.

SUMMARY OF THE INVENTION

An object of the invention is to provide an improved proportional pressure control valve which can be set, according to DE 103 25 178 A1, with the user connection at a residual pressure of 0 bar having a simpler and more compact construction.

According to the invention, this object is basically achieved by a proportional pressure control valve having the fluid-conducting connection to the pilot chamber integrated essentially completely into the valve housing by a bore. The bore extends in the axial direction, is formed in a housing wall and emerges from a radial bore of the valve housing forming the pump connection. In the latter known solution, to form the fluid-conducting connection, the control piston is provided with an inner connecting channel which, before discharging into the pilot chamber, has an orifice to which a flow diffusor is connected downstream and a protective screen is connected upstream. For the control piston this yields not only a comparatively complex construction, but also a considerable installation length, as a result of which in turn a corresponding installation length of the valve housing is dictated. The valve according to the invention is, in contrast, characterized by the desired compact and simplified construction.

In another advantageous configuration, according to the invention the user connection can be formed by the coaxial, end-side opening of the valve housing. This configuration yields the especially advantageous possibility of further reducing the installation length, because, offset in the longitudinal direction of the valve housing, on the valve housing only two connections through which flow takes place radially need be formed by radial bores, specifically the pump connection and the tank connection. The control piston need then has a correspondingly smaller number of peripheral control edges, allowing simplification and a reduction in the required installation length.

Advantageously, the control piston can have, as a movable boundary of the pilot chamber, a closed, planar piston surface which lies in one radial plane.

Advantageously, a valve body of the pilot valve, which body is located stationary in the valve housing, forms a further, stationary boundary of the pilot chamber and the end section of the fluid-conducting connection to the pilot chamber, which section is remote from the pump connection.

In these exemplary embodiments, the end section of the fluid-conducting connection contains a radial channel which extends between an inner coaxial bore of the valve body and an annular gap. Between the peripheral surface of the valve body and the valve housing, the annular gap forms a filtration gap into which the end of the radial bore of the valve housing discharges. This design likewise contributes to a compact structure because the installation of the protective filter for the pilot fluid does not necessitate any additional axial installation length.

Since, as mentioned, a valve system is devised in which it can be ensured that on the user connection a pressure value of 0 bar is set without the magnet system actuated, the invention is especially well suited for use in hydraulically actuated clutches, for whose operational reliability it is essential that when the clutch is released. The clutch packs or disk packs which are engaged are reliably separated from one another. The subject matter of the invention is therefore also the use of the valve according to the invention for hydraulically actuatable clutches.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 5 is a front elevational view in section of a proportional pressure control valve according to a second exemplary embodiment of the invention, drawn on a somewhat smaller scale compared to FIGS. 2 to 4;

FIG. 6 is a partial front elevational view in section of only the region designated in FIG. 5 within the dot-dash circle, enlarged compared to FIG. 5;

DETAILED DESCRIPTION OF THE INVENTION

Figure 1:
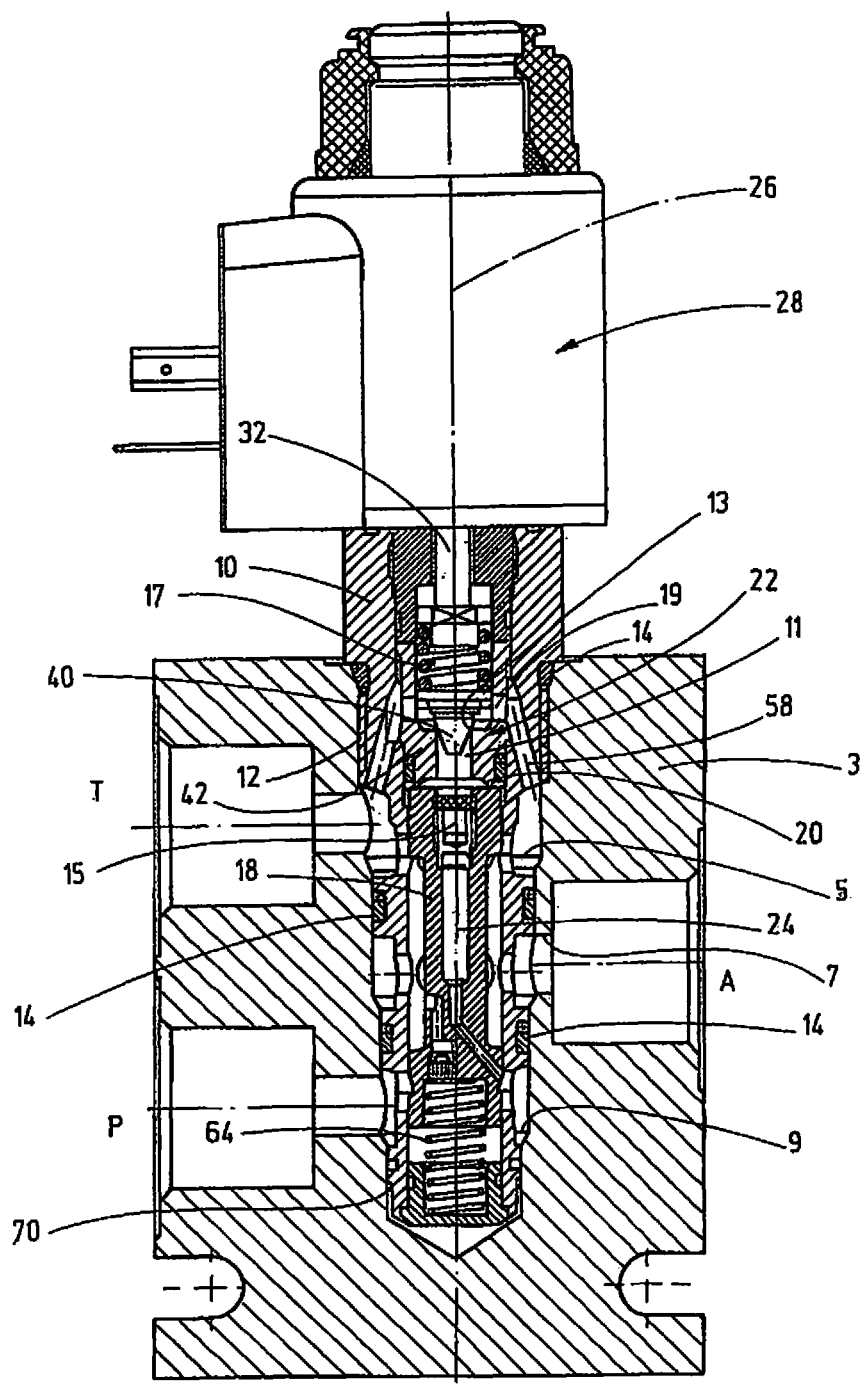
FIG. 1 is a front elevational view, partially in section, of a proportional pressure control valve according to the prior art.

FIG. 1 shows a proportional pressure control valve of the prior art according to DE 103 25 178 A1. The valve, designed as a screw-in cartridge, has a valve housing 10 which can be screwed into a machine part (not detailed), for example, in the form of a valve block 3, via a screw-in section 12. For the sealed connection to the valve block 3, the valve housing 10 has gaskets 14 on the outer peripheral side seated in the corresponding receivers. The valve housing 10, viewed in the direction of FIG. 1, from top to bottom has radial bores 5 for a tank connection T, radial bores 7 for a user connection A, and radial bores 9 for a pump connection P for a hydraulic pump 16 (cf. FIG. 7). Within the valve housing 10, a control piston 18 is movably guided lengthwise for selective connection of the pump connection P to the user connection A and of the user connection A to the tank connection T.

To establish a fluid-conducting connection between the pump connection P and a pilot chamber 20 of a pilot valve 22, the control piston 18 is provided with a connecting channel 24 which is coaxial to the longitudinal axis 26. Connecting channel 24 is offset in its end section at the bottom in FIG. 1 leading to a radial bore 9 of the pump connection P and is connected in its upper end section to the pilot chamber 20 via an outlet system 15. The outlet system 15 contains an orifice to which, in the fluid flow direction, a protective screen is connected upstream and a diffusor is connected downstream. The diffuser is used preferentially to deflect the directed oil jet flowing out of the orifice so that it does not directly strike the movable closing part 40 of the pilot valve 22.

The pilot valve 22 has a stationary valve body 42 in which an inner, coaxial bore 11 is open, on the one hand, toward the pilot chamber 20 and, on the other hand, on the opening edge it has a seat 13 for the movable closing part 40 of the pilot valve 22. Valve 22 can be actuated via a magnet system 28, in particular in the form of a proportional magnet system. If this magnet system is energized, its actuating plunger 32 is moved downward in FIG. 1, as a result of which the closing part 40 is pressed against the valve seat 13 via a spring arrangement 17 with a closing force dependent on the intensity with which the magnet system 28 is energized to close the pilot valve 22.

If the proportional magnet system 28 remains deenergized, hydraulic medium (oil) can flow from the user connection A to the tank connection T. In this valve state, the pilot valve 22 is open, and the control piston 18 is moved onto its upper stroke stop against the lower side of the valve body 42. In this operating position, the oil flows from the pump connection P through the control piston 18 to the pilot chamber 20 and from there via the opened pilot valve 22 to a distributor chamber 19 from which it drains via channels 58 to the tank connection T. This volumetric flow can be defined as a pilot oil flow or leakage.

When current is supplied to the magnet system 28, the closing part 40 presses on the valve seat 13 and, in so doing, interrupts the volumetric flow. The pilot chamber 20 is thus filled with the hydraulic medium, as a result of which the pressure in this chamber rises. This rising pressure acts on the upper face side of the control piston 18 and moves it in the direction of the lower stroke stop 70 against the compressing compression spring 64. The pressure in the pilot chamber 20 then corresponds to the adjusted pressure.

When the closing pressure of the closing part 40 on the seat 13 of the valve body 42 closes the pilot valve 22 by energizing the magnet system 28, the pressure in the pilot chamber 22 rises to a pressure value at which the control piston 18 is moved downward in the figure against the main piston spring 64 until a position is reached in which the user connection A is connected to the pump connection P. When the controlled pressure is reached, the control piston 18 is moved such that the connection between the pump connection P and the user connection A is throttled. The control piston 18 is moved into a position in which the two force levels are in equilibrium with one another, and in this way it defines an opening window between the pump connection P and the user connection A. Therefore, a pressure is established on the user connection A, which is in a direct relationship to the electrical control signal of the magnet system 28.

Figure 2:
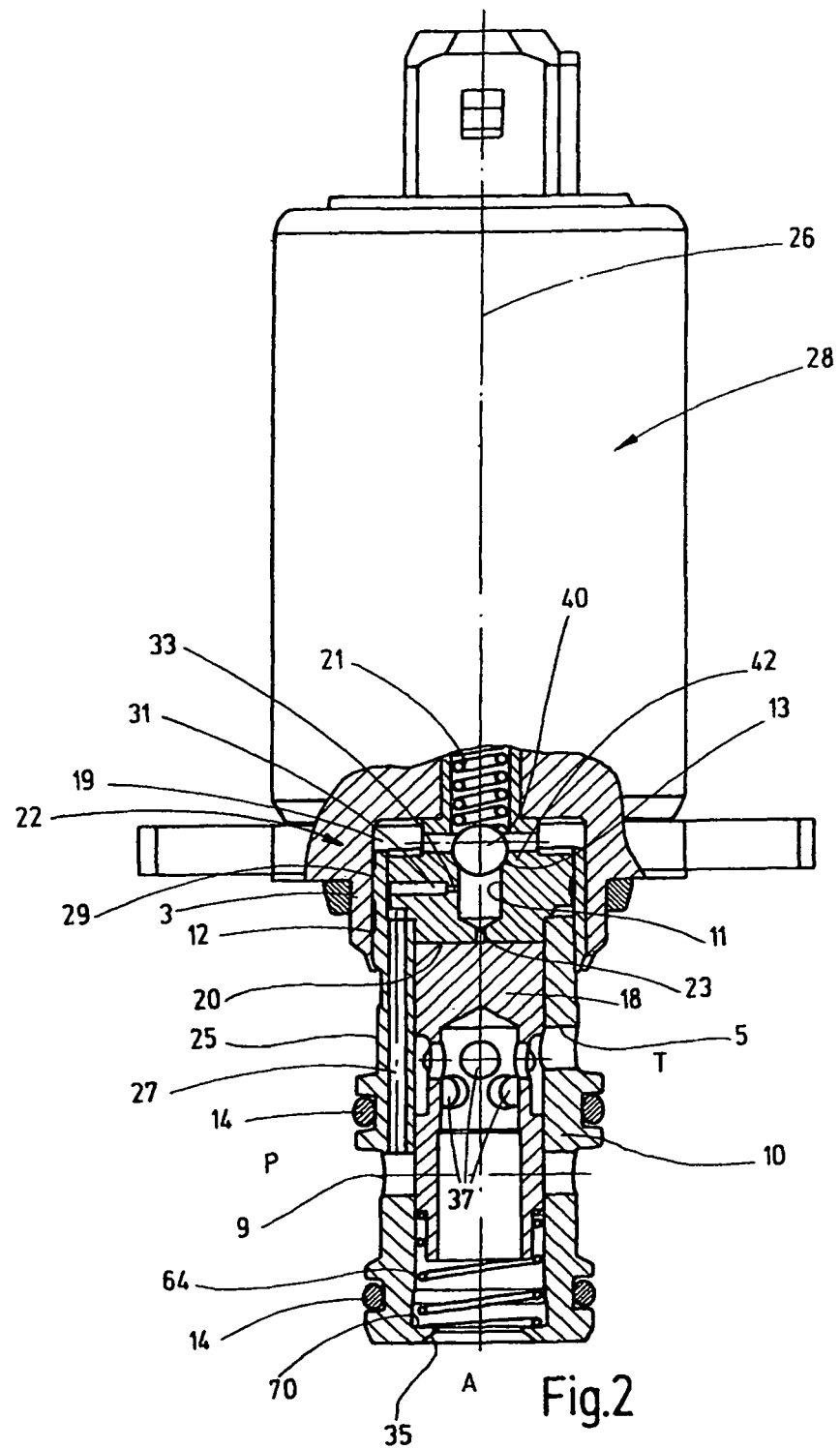
FIGS. 2 to 4 are front elevational views partially in section of the proportional pressure control valve according to a first exemplary embodiment of the invention in different operating or actuating positions.
Figure 3:
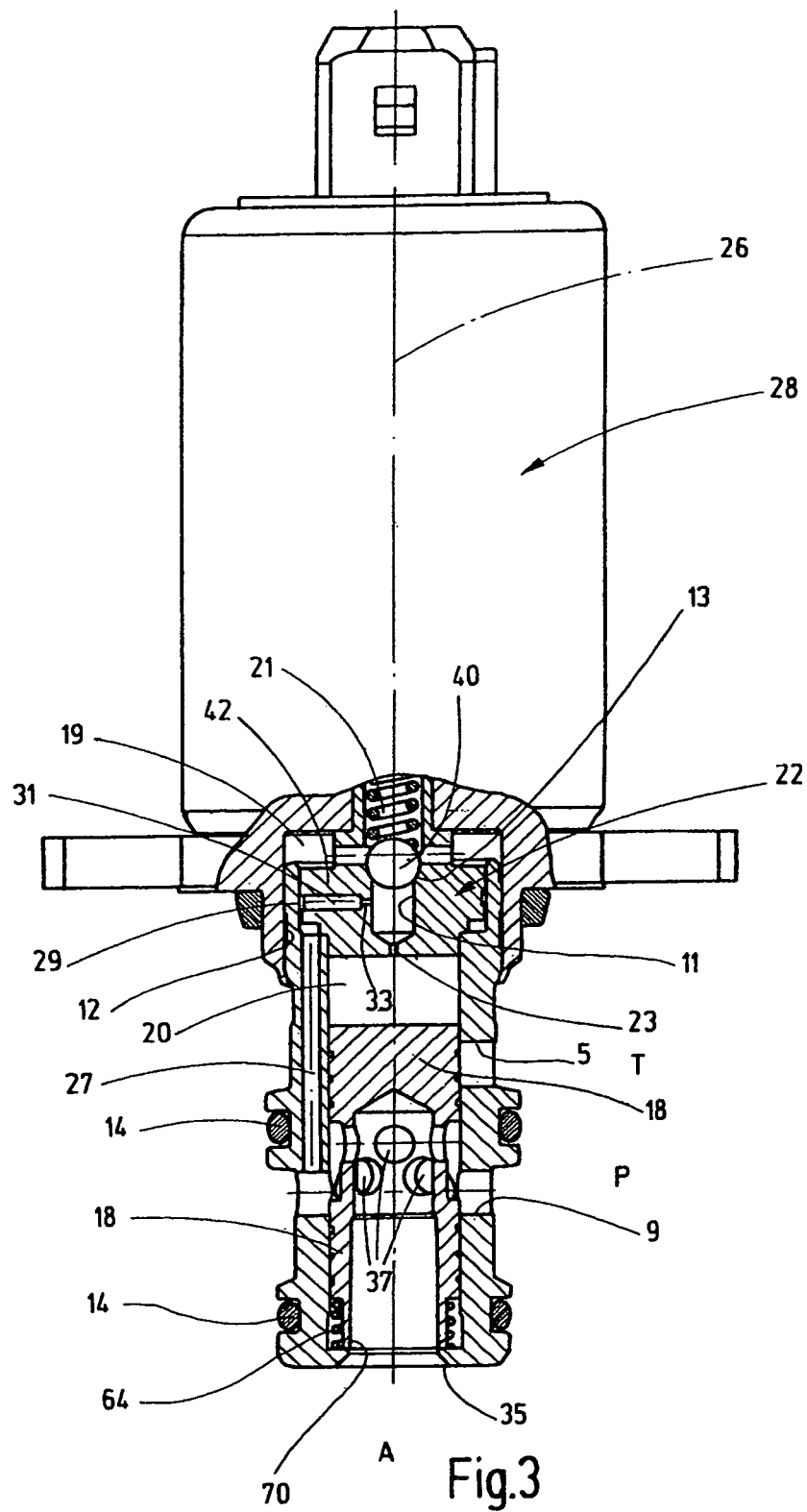
Figure 4:
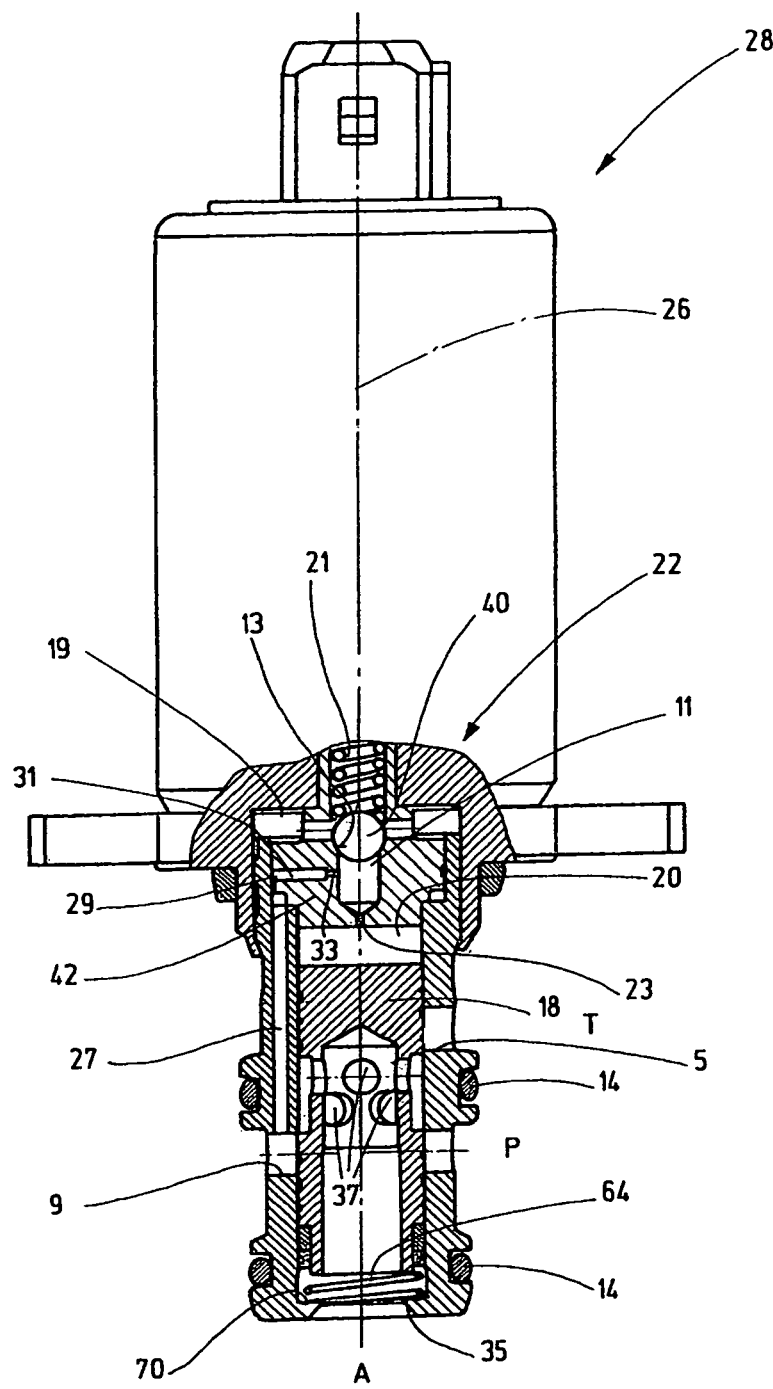

FIGS. 2 to 4 illustrate a first exemplary embodiment of the proportional pressure control valve according to the invention. Parts which correspond to those of the valve of FIG. 1 are marked with the same reference numbers as in FIG. 1. The plunger of the magnet system 28, which plunger is not shown, acts via a pilot spring 21 on the closing part 40 of the pilot valve 22, which part is formed by a ball. As in the known solution according to FIG. 1, the closing part 40 interacts with a valve seat 13 located on the opening edge of an inner coaxial bore 11 of a stationary valve body 42. The bottom of the valve body 42 which faces away from the valve seat 13 forms the stationary boundary of the pilot chamber 20 and the upper stroke stop of the control piston 18, whose upper planar piston surface forms the movable boundary of the pilot chamber 20. The interior of the coaxial inner bore 11 of the valve body 42 is fluid-connected via a damping orifice 23 to the pilot chamber 20. This orifice 23 forms the end part of the fluid-conducting connection between the pump connection P and pilot chamber 20. The main part of the fluid-conducting connection is formed by an axial bore 27 in the wall of the valve housing 10 and having its origin on a radial bore 9 of the pump connection P. From here the axial bore 27 leads to the outer periphery of the stationary valve body 42 where the axial bore 27 undergoes transition into an annular gap 29. The gap 29 forms a filtration gap between the end of the axial bore 27 and a radial channel 31 which leads in the valve body 42 via a control oil orifice 33 to the inner coaxial bore 11, whence the fluid connection via the damping orifice 23 to the pilot chamber 20 is completed.

FIG. 2 shows an operating state in which the magnet system 28 is not energized, the pilot valve 22 conversely is not closed, and thus a fluid pressure does not build up in the pilot chamber 20 because the fluid which has been supplied via fluid-conducting connection 27, 29, 31, 33 can drain via the distributor chamber 19 to the tank side. Accordingly, the control piston 18 is under the influence of the spring 64 in the upper end position where it adjoins the stroke stop, i.e., the bottom of the valve body 42. Since in the valve according to the invention only the tank connection T and the pump connection P are formed by radial bores 5 and 9 respectively, while the user connection A is formed by the coaxial, end-side opening 35 of the housing 10, in the operating position from FIG. 2 the user connection A and the tank connection T are connected to one another. Specifically, the control piston 18 then has an interior open to the opening 35 of the valve housing 10. Fluid in the interior of control piston 18 can emerge via passages 37 in the wall of the piston 18 to the tank connection T.

FIGS. 3 and 4 show operating states depending on the energizing of the magnet system 28. FIG. 3 shows the operating state in which the closing part 40 is pressed onto the valve seat 13 by energizing the magnet system 28 via the spring 21 so that in the pilot chamber 20 a pressure is built up which has moved the control piston 18 onto its lower stroke stop 70. As is apparent, in this piston position the pump connection P and the user connection A are connected to one another. Also apparent from FIG. 3, is that large opening cross sections between the interior of the control piston 18 and the radial bores 9 are formed so that in an application to actuate a clutch cylinder, filling is prompt.

When a fill pressure of the consumer is reached, on the user connection A, for example, of the clutch cylinder, and when there is a force which acts in this way on the piston 18, the piston is pushed upward FIG. 4, until the connection from the pump connection P to the user connection A is throttled or completely blocked. As likewise shown in FIG. 4, the user connection A and the tank connection T can be connected to one another, with a piston position being established in which the piston is in force equilibrium. The illustrated valve construction is characterized by high dynamics and low pressure loss, as a result of which, when used for clutch actuation, rapid filling with oil and rapid evacuation of the clutch are ensured. The invention is therefore also especially well suited for these applications because in the deenergized state of the magnet system 28 the user connection A is completely relieved.

A second, modified exemplary embodiment of the valve according to the invention is shown in FIGS. 5 and 6. In the example of FIGS. 2 to 4, the valve is subject to a certain leakage because in almost any operating state a control oil flow drains permanently to the tank. While the control oil orifice 33 keeps this leakage to a low value, it is still useful to reduce leakage losses. In the exemplary embodiment from FIGS. 5 and 6, for this purpose the piloting is configured such that, instead of a seat valve with spring-loaded closing part, a directly controlled pressure regulator is integrated into the piloting. The fluid-conducting connection, as in the above described exemplary embodiment, in the starting part is made by the axial bore 27 extending in the wall of the valve housing 10 and leading to the inner coaxial bore 11 in the valve body 42 via the peripheral annular gap 29 of the stationary valve body 42 and via a radial channel 31 located in it. A valve piston 38 is guided in inner bore 11 to be able to move lengthwise and is held nonpositively on the plunger 32 of the magnet system 28 via a reset spring 39, and, when the magnet system 28 is energized, can be moved downward in FIGS. 5-6. The valve piston 38 has a bore 41 which is open to the pilot chamber 20 and peripheral control edges 43, 44 which are connected to that bore 41 so that, depending on the axial position of the valve piston 38, the radial channel 31 and thus the fluid-conducting connection to the pump connection P are connected to the pilot chamber 20 or are blocked. In the position in which the radial channel 31 is blocked, the pilot chamber 20 is opened to the distributor chamber 19 and thus to the tank via the axial piston bore 41 and the control edge 44. There is no direct connection from the pump connection P to the tank connection T in any operating state. The valve then works without additional losses due to the draining pilot oil. The leakage is therefore reduced to the valve spool leakage, which occurs on the annular gaps of the peripheral surfaces of the two pistons.

The proportional pressure control valve according to the invention is one which is advantageous especially for clutch applications. In these applications, the main demands are for high dynamics and low pressure losses in order to be able to ensure a rapid process of filling with oil and a rapid evacuation of the clutch. These demands are easily accomplished with this valve configuration. Moreover, the valve according to the invention can be completely relieved; i.e., when the electrical control signal on the magnet system 28 is taken away, the controlled pressure on the user connection A is brought to the pressure value of 0 bar. In conventionally pilot-operated pressure valves, this main stage (control piston) is returned with a clamped compression spring to its end position so that, when there is no electrical control signal on the magnet system, the known valves always have a pressure level that corresponds to the force of the clamped spring, then leading to problems in the decoupling of hydraulically operating clutches.

Figure 7:
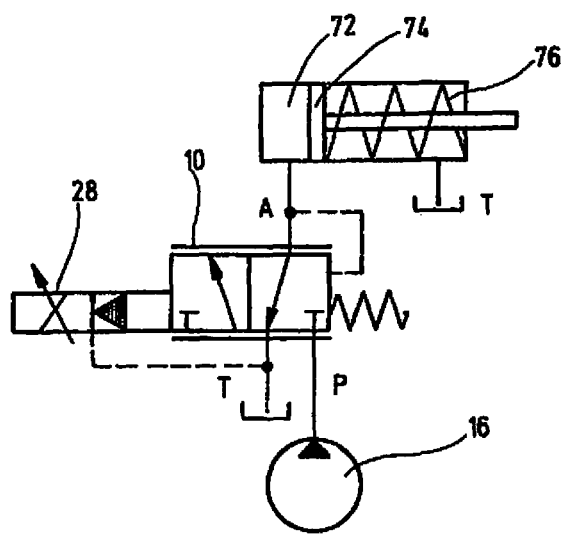
FIG. 7 is a simplified schematic diagram of a proportional pressure control valve according to the invention for use in a multiple-disk clutch.

To illustrate this, the use of the proportional pressure control valve according to the invention is detailed with reference to FIGS. 7 and 8 for a hydraulically operating clutch. According to the representation in FIG. 7 the proportional pressure control valve is connected between the clutch parts 72, 74, 76 and the hydraulic pump 16.

Clutches are used, among other things, to connect two shafts, for example the shafts of heavy machinery to transmission shafts. In this hydraulic clutch, a cylinder chamber 72 is connected to the pressure line or the pressure connection P of the hydraulic pump 16 by actuating the proportional pressure control valve according to the invention. In so doing, the spring-loaded piston 74 compresses a clutch disk pack which is not detailed. By switching over the proportional pressure control valve, the cylinder chamber 72 is then evacuated, and the compression spring arrangement 76 according to FIG. 7 pushes the piston 74 back into its initial position. In so doing, the remaining hydraulic medium is pushed out in the direction toward the tank T via the user connection A.

Figure 8:
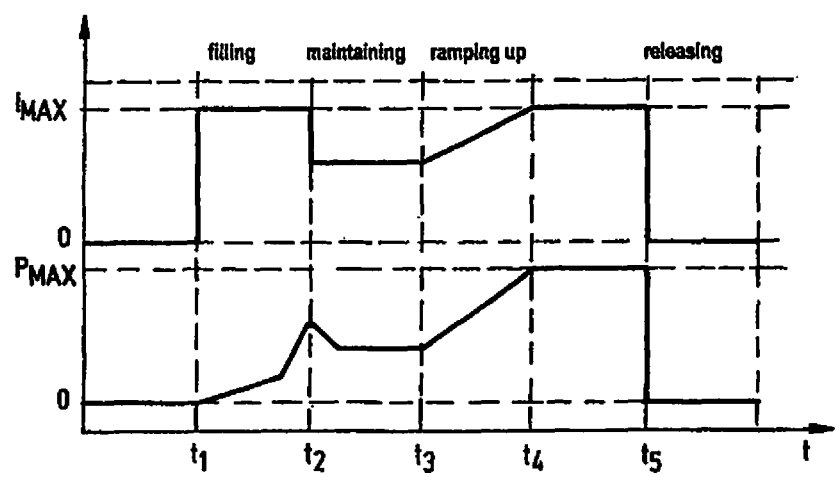
FIG. 8 is a graph illustrating the progression of a clutch play process for a clutch valve arrangement according to the hydraulic arrangement from FIG. 7.

FIG. 8 shows the progression of a clutch play. First, the clutch must be quickly filled with oil (hydraulic medium). This filling takes place in the time interval $t_1$ to $t_2$, with the piston 74 beginning to compress the clutch disk pack. This process is accompanied by a brief, very high volumetric flow. Afterwards, this state is maintained in the time interval from $t_2$ to $t_3$ and is slowly "ramped up" in the interval $t_3$ to $t_4$ by the pressure being slowly raised linearly by the proportional pressure control valve according to the invention. The force from the heavy machinery is then uniformly transmitted to the transmission line. At time $t_5$, by returning the electrical control signal on the magnet system 28, the pressure in the clutch is removed so that the compressed disk pack, under additional action of the compression spring arrangement 76, can push the piston 74 back into its original position again. This operation to remove pressure is easily possible since as already shown the pressure value on the connection A has the value 0 in this operating position.

While various embodiments have been chosen to illustrate the invention, it will be understood by those skilled in the art that various changes and modifications can be made therein without departing from the scope of the invention as defined in the appended claims.

What is claimed is:

1. A proportional pressure control valve, comprising:
a valve housing having a pump connection, a user connection and a tank connection, said pump connection being a radial bore in said valve housing;
a control piston guided for longitudinal movement in said valve housing to connect selectively said pump connection to said user connection and to connect selectively said user connection to said tank connection;
a pilot valve with a pilot valve body and a pilot chamber in said valve housing, a movable boundary of said pilot chamber being a closed, planar piston surface lying in one radial plane on said control piston, said pilot valve body being arranged stationary in said valve housing and forming a stationary boundary of said pilot chamber;

a proportional magnet system connected to and controlling said pilot valve; and a fluid-conducting connection extending between said pump connection and said pilot chamber and having an axial bore extending in an axial direction within a wall of said valve housing and emerging from said radial bore, said pilot valve body forming an end section of said fluid-conducting connection to said pilot chamber, said end section being remote from said pump connection and containing a radial channel extending between a coaxial inner bore of said pilot valve body and an annular gap forming a filtration gap between a peripheral surface of said pilot valve body and said valve housing, an end of said axial bore discharging into said filtration gap.

2. A proportional pressure control valve according to claim 1 wherein said user connection comprises a coaxial end opening in said valve housing.

3. A proportional pressure control valve according to claim 1 wherein a distribution chamber is in said valve housing and borders on an end of said valve body facing away from said pilot chamber, connected to said tank connection and accommodating fluid flowing through said pilot valve.

4. A proportional pressure control valve according to claim 1 wherein a seat is on an edge of said inner bore facing away from said pilot chamber; and a movable closing element pretensioned by a pilot spring releasably engages said seat.

5. A proportional pressure control valve according to claim 1 wherein said radial channel of said pilot valve body discharges via an orifice into said inner bore.

6. A proportional pressure control valve according to claim 5 wherein said inner bore of said pilot valve body is connected via a damping orifice to said pilot chamber.

7. A proportional pressure control valve according to claim 1 wherein a pilot piston is axially movable in said inner bore of said pilot valve body and forms an adjustable pressure regulator for said pilot chamber.

8. A proportional pressure control valve according to claim 1 wherein a spring acts on an end of said control piston facing away from said pilot chamber and biases said control piston toward said pilot chamber.

9. A proportional pressure control valve according to claim 1 wherein said user connection is connected to a cylinder chamber of a hydraulically adjustable clutch to compress a disk pack.

10. A proportional pressure control valve, comprising:

a valve housing having a pump connection, a user connection and a tank connection, said pump connection being a radial bore in said valve housing;

an external thread on said valve housing for forming a threaded connection in a bore of a valve block and forming said valve housing as a screw-in cartridge;

a control piston guided for longitudinal movement in said valve housing to connect selectively said pump connection to said user connection and to connect selectively said user connection to said tank connection;

a pilot valve with a pilot valve body and a pilot chamber in said valve housing, a movable boundary of said pilot chamber being a closed, planar piston surface lying in one radial plane on said control piston, said pilot valve body being arranged stationary in said valve housing and forming a stationary boundary of said pilot chamber;

a proportional magnet system connected to and controlling said pilot valve; and a fluid-conducting connection extending between said pump connection and said pilot chamber and having an axial bore extending in an axial direction within a wall of said valve housing and emerging from said radial bore, said pilot body forming an end section of said fluid-conducting connection to said pilot chamber, said end section being remote from said pump connection and containing a radial channel extending between a coaxial inner bore of said pilot valve body and an annular gap forming a filtration gap between a peripheral surface of said pilot valve body and said housing, an end of said axial bore discharging into said filtration gap.

11. A proportional pressure control valve according to claim 10 wherein said user connection comprises a coaxial end opening in said valve housing.

12. A proportional pressure control valve according to claim 10 wherein a distribution chamber is in said valve housing and borders on an end of said valve body facing away from said pilot chamber, connected to said tank connection and accommodating fluid flowing through said pilot valve.

13. A proportional pressure control valve according to claim 10 wherein a seat is on an edge of said inner bore facing away from said pilot chamber; and a movable closing element pretensioned by a pilot spring releasably engages said seat.

14. A proportional pressure control valve according to claim 10 wherein said radial channel of said pilot valve body discharges via an orifice into said inner bore.

15. A proportional pressure control valve according to claim 14 wherein said inner bore of said pilot valve body is connected via a damping orifice to said pilot chamber.

16. A proportional pressure control valve according to claim 10 wherein a pilot piston is axially movable in said inner bore of said pilot valve body and forms an adjustable pressure regulator for said pilot chamber.

17. A proportional pressure control valve according to claim 10 wherein a spring acts on an end of said control piston facing away from said pilot chamber and biases said control piston toward said pilot chamber.

18. A proportional pressure control valve according to claim 10 wherein said user connection is connected to a cylinder chamber of a hydraulically adjustable clutch to compress a disk pack.

* * * * *